(12) United States Patent
Göransson

(10) Patent No.: US 12,294,432 B2
(45) Date of Patent: May 6, 2025

(54) ESTIMATING ANGULAR SPREAD OF A WIRELESS CHANNEL

(71) Applicant: Telefonaktiebolaget LM Ericsson (publ), Stockholm (SE)

(72) Inventor: Bo Göransson, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 2 days.

(21) Appl. No.: 18/280,732

(22) PCT Filed: May 4, 2021

(86) PCT No.: PCT/SE2021/050414
§ 371 (c)(1),
(2) Date: Sep. 7, 2023

(87) PCT Pub. No.: WO2022/235179
PCT Pub. Date: Nov. 10, 2022

(65) Prior Publication Data
US 2024/0154659 A1    May 9, 2024

(51) Int. Cl.
*H04B 7/06* (2006.01)
*H04B 17/318* (2015.01)
*H04L 5/00* (2006.01)

(52) U.S. Cl.
CPC ......... *H04B 7/0617* (2013.01); *H04B 17/318* (2015.01); *H04L 5/0023* (2013.01)

(58) Field of Classification Search
CPC ... H04B 7/0617; H04B 17/318; H04L 5/0023; H04W 16/28
(Continued)

(56) References Cited

U.S. PATENT DOCUMENTS

| | | | |
|---|---|---|---|
| 6,321,066 B1 * | 11/2001 | Katz | H04W 16/28 455/25 |
| 2004/0242156 A1 * | 12/2004 | Tiirola | H04B 7/005 455/25 |
| 2019/0341989 A1 * | 11/2019 | Raghavan | H04B 7/1555 |

FOREIGN PATENT DOCUMENTS

| | | |
|---|---|---|
| WO | 0135537 A2 | 5/2001 |
| WO | 2019050440 A1 | 3/2019 |

(Continued)

OTHER PUBLICATIONS

Bengtsson, et al., "Low Complexity Estimation of Angular Spread with an Antenna Array," IFAC System Identification, Fukuoka, Japan, 1997, pp. 525-530.
(Continued)

*Primary Examiner* — Leila Malek
(74) *Attorney, Agent, or Firm* — Withrow & Terranova, PLLC

(57) ABSTRACT

According to a first aspect, it is provided a method for estimating angular spread of a wireless channel between a first node and a second node, wherein the first node is a radio network node and the second node is a user equipment, UE, or vice versa. The method is performed in a spread estimator. The method comprises the steps of: obtaining a wide-beam signal strength for a signal over the wireless channel using a selected wide-beam configuration of an antenna of the first node; obtaining a narrow-beam signal strength for a signal over the wireless channel using a selected narrow-beam configuration of the antenna of the first node; determining a difference between the wide-beam signal strength and the narrow-beam signal strength; and estimating angular spread of the wireless channel based on the difference.

20 Claims, 6 Drawing Sheets

(58) Field of Classification Search
USPC .......................................................... 375/262
See application file for complete search history.

(56) References Cited

FOREIGN PATENT DOCUMENTS

| WO | 2019120523 A1 | 6/2019 |
|----|---------------|--------|
| WO | 2019197030 A1 | 10/2019 |

OTHER PUBLICATIONS

Bengtsson, et al., "Low-Complexity Estimators for Distributed Sources," IEEE Transactions on Signal Processing, vol. 48, Issue 8, Aug. 2000, pp. 2185-2194.
Trump, et al., "Estimation of nominal direction of arrival and angular spread using an array of sensors," Signal Processing, vol. 50, 1996, Elsevier, pp. 57-69.
Zetterberg, et al., "The Spectrum Efficiency of a Basestation Antenna Array System for Spatially Selective Transmission," Proceedings of the IEEE Vehicular Technology Conference, Jun. 1994, Stockholm, Sweden, pp. 1517-1521.
International Search Report and Written Opinion for International Patent Application No. PCT/SE2021/050414, mailed Dec. 23, 2021, 9 pages.

* cited by examiner

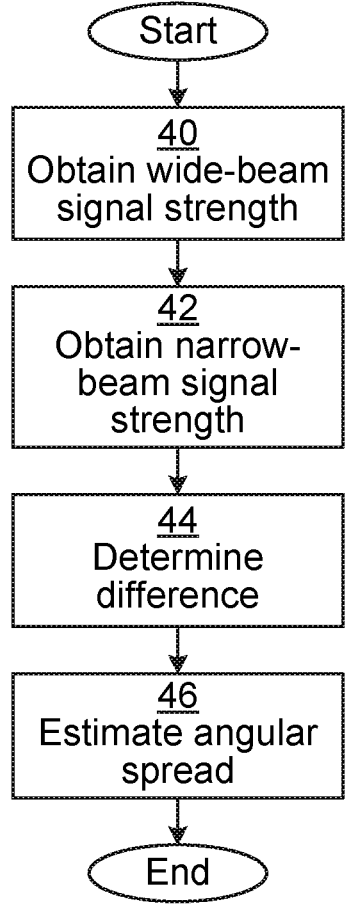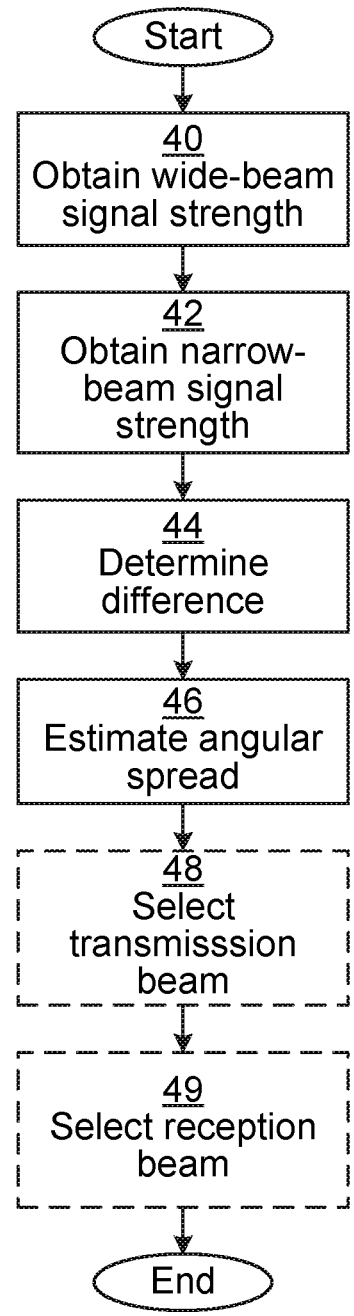
Fig. 5A
Fig. 5B

ESTIMATING ANGULAR SPREAD OF A WIRELESS CHANNEL

This application is a 35 U.S.C. § 371 national phase filing of International Application No. PCT/SE2021/050414, filed May 4, 2021, the disclosure of which is incorporated herein by reference in its entirety.

TECHNICAL FIELD

The present disclosure relates to the field of wireless channels between a radio network node and a user equipment (UE) of a cellular network, and in particular to estimating angular spread of the wireless channel.

BACKGROUND

In modern cellular networks, antenna arrays with a plurality of antenna elements are provided that allow radio beams to be dynamically controlled for each wireless channel between radio network node and UE. This enables directional radio transmission and reception. The radio beams can be configured in terms of direction and beamwidth.

The beamwidth and gain of a beam depend on the size of the antenna array. In general, increasing the size of the array results in higher gain but also a narrower beam. By suitably controlling the signals to individual antenna elements, the beam direction as well as the beam width of a large antenna array can be controlled. If the transmitter and receiver are in line-of-sight, a narrow beam is generally an advantage since a higher SNR (Signal-to-noise ratio) can be achieved. However, if the wireless channel between the transmitter and the receiver contains many reflections, resulting in a higher angular spread of the wireless channel, a narrow beam will not capture all the rays or power received on the array. Similarly in transmit mode, an excessively narrow beam will not illuminate all paths that contribute to the channel. The best beam is often one that has a width that is similar to the angular spread.

The angular spread of the wireless channel can be estimated and used to adapt the beamwidth to match the channel. By adapting the beamwidth to the angular spread, a compromise can be found that balances high beam gain and good usage of the channel support. It is to be noted that a narrower beam, in general, provides higher gain but in this case may not use the spatial support in the channel in a good way.

In the prior art, angular spread is estimated from array data or its covariance matrix. This requires access to data from each antenna port. In many implementations, this data is not available to the system since the beamforming operation is applied as the first step. The main reason for this is to reduce the amount of data that is sent to baseband for further processing in receive mode. When transmitting, the opposite is done. A few data streams (e.g. spatial layers) are generated in baseband which are then expanded to the antenna domain in the radio by the beamformers. The beams that are applied can either be from a codebook or generated in any other way. But since the angular spread of the wireless channel is unknown, it is still unknown what beamwidth to choose for a beam.

SUMMARY

One object is to provide a more robust and accessible way to estimate angular spread of a wireless channel.

According to a first aspect, it is provided a method for estimating angular spread of a wireless channel between a first node and a second node, wherein the first node is a radio network node and the second node is a user equipment, UE, or vice versa. The method is performed in a spread estimator. The method comprises the steps of: obtaining a wide-beam signal strength for a signal over the wireless channel using a selected wide-beam configuration of an antenna of the first node, the selected wide-beam configuration being the one, of a plurality of wide-beam configurations, that results in the greatest signal strength; obtaining a narrow-beam signal strength for a signal over the wireless channel using a selected narrow-beam configuration of the antenna of the first node, the selected narrow-beam configuration being configured with a beam that is narrower than the selected wide-beam configuration, the selected narrow-beam configuration being the one of a plurality of narrow-beam configurations within a coverage area of the selected wide-beam configuration that results in the greatest signal strength; determining a difference between the wide-beam signal strength and the narrow-beam signal strength; and estimating angular spread of the wireless channel based on the difference.

The step of estimating angular spread may comprise selecting, based on the determined difference, a matching range from a plurality of ranges of differences, wherein each range is associated with a particular angular spread.

The matching range may be selected also based on a direction of the selected wide-beam configuration.

The wide-beam signal strength may be obtained for a signal received by the first node and/or the narrow beam signal strength may be obtained for a signal received by the first node.

The wide-beam signal strength may be obtained for a signal received by the second node and reported to the first node, and/or the narrow beam signal strength may be obtained for a signal received by the second node and reported to the first node.

The wide-beam signal strength may be based on measurements of SSB, Synchronization Signal Block, transmissions from the radio network node over different wide-beam configurations.

The narrow-beam signal strength may be based on measurements of instances of CSI-RS, Channel State Information-Reference Signal, from the radio network node over different narrow-beam configurations.

The method may further comprise the step of: selecting a transmission beam configuration based on the estimated angular spread, wherein the transmission beam configuration is used for wireless transmissions from the first node to the second node.

The method may further comprise the step of: selecting a reception beam configuration based on the estimated angular spread, wherein the reception beam configuration is used for wireless receptions from by the first node from the second node.

The first node can be a radio network node and the second node can be a user equipment, UE. Alternatively, the first node is a UE and the second node is a radio network node.

According to a second aspect, it is provided a spread estimator for estimating angular spread of a wireless channel between a first node and a second node, wherein the first node is a radio network node and the second node is a user equipment, UE, or vice versa. The spread estimator comprises: a processor; and a memory storing instructions that, when executed by the processor, cause the spread estimator to: obtain a wide-beam signal strength for a signal over the wireless channel using a selected wide-beam configuration of an antenna of the first node, the selected wide-beam configuration being the one, of a plurality of wide-beam configurations, that results in the greatest signal strength; obtain a narrow-beam signal strength for a signal over the wireless channel using a selected narrow-beam configuration of the antenna of the first node, the selected narrow-beam configuration being configured with a beam that is narrower than the selected wide-beam configuration, the selected narrow-beam configuration being the one of a plurality of narrow-beam configurations within a coverage area of the selected wide-beam configuration that results in the greatest signal strength; determine a difference between the wide-beam signal strength and the narrow-beam signal strength; and estimate angular spread of the wireless channel based on the difference.

The instructions to estimate angular spread may comprise instructions that, when executed by the processor, cause the spread estimator to select, based on the determined difference, a matching range from a plurality of ranges of differences, wherein each range is associated with a particular angular spread.

The matching range may be selected also based on a direction of the selected wide-beam configuration.

The wide-beam signal strength may be obtained for a signal received by the first node and/or the narrow beam signal strength is obtained for a signal received by the first node.

The wide-beam signal strength may be obtained for a signal received by the second node and reported to the first node, and/or the narrow beam signal strength is obtained for a signal received by the second node and reported to the first node.

The wide-beam signal strength may be based on measurements of SSB, Synchronization Signal Block, transmissions from the radio network node over different wide-beam configurations.

The narrow-beam signal strength may be based on measurements of instances of CSI-RS, Channel State Information-Reference Signal, from the radio network node over different narrow-beam configurations.

The spread estimator may further comprise instructions that, when executed by the processor, cause the spread estimator to: select a transmission beam configuration based on the estimated angular spread, wherein the transmission beam configuration is used for wireless transmissions from the first node to the second node.

The spread estimator may further comprise instructions that, when executed by the processor, cause the spread estimator to: select a reception beam configuration based on the estimated angular spread, wherein the reception beam configuration is used for wireless receptions from by the first node from the second node.

The first node may be a radio network node and the second node may be user equipment, UE. Alternatively, the first node is a UE and the second node is a radio network node.

According to a third aspect, it is provided a computer program for estimating angular spread of a wireless channel between a first node and a second node, wherein the first node is a radio network node and the second node is a user equipment, UE, or vice versa. The computer program comprises computer program code which, when executed on a spread estimator causes the spread estimator to: obtain a wide-beam signal strength for a signal over the wireless channel using a selected wide-beam configuration of an antenna of the first node, the selected wide-beam configuration being the one, of a plurality of wide-beam configurations, that results in the greatest signal strength; obtain a narrow-beam signal strength for a signal over the wireless channel using a selected narrow-beam configuration of the antenna of the first node, the selected narrow-beam configuration being configured with a beam that is narrower than the selected wide-beam configuration, the selected narrow-beam configuration being the one of a plurality of narrow-beam configurations within a coverage area of the selected wide-beam configuration that results in the greatest signal strength; determine a difference between the wide-beam signal strength and the narrow-beam signal strength; and estimate angular spread of the wireless channel based on the difference.

According to a fourth aspect, it is provided a computer program product comprising a computer program according to the third aspect and a computer readable means comprising non-transitory memory in which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which:

FIGS. 5A-B are flow charts illustrating embodiments of methods for estimating angular spread of a wireless channel between a first node and a second node;

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Embodiments presented herein are used to estimate angular spread on a wireless channel between a particular combination of radio network node and UE. This is based both on signal strength measurements over wide-beam configurations and narrow-beam configurations. Signal strength can be e.g. received signal power or any other suitable quantity of signal magnitude. The wide-beam configuration is selected as the one that results in the highest signal strength. The wide-beam configuration is selected from a finite set of wide-beams, where the beams of the set typically having similar widths but pointing in different directions, so that the beams of the set together cover a desired coverage area of the antenna. Then, the narrow-beam configuration, of the narrow-beam configurations that are within the coverage of the selected wide-beam configuration, is selected that results in the highest signal strength. A difference in signal strength is then calculated between the signal strength for the selected wide-beam configuration and the signal strength for the selected narrow-beam configuration. It has been found that this difference in signal strength not only varies between different angular spreads of the wireless channel, but is also relatively independent of other properties of the channel, leading to different angular spreads being distinguishable from each other using this difference. This is exploited by embodiments presented herein by estimating the angular spread based on this difference in signal strength. The angular spread estimation can then be used e.g. for configuring beams for subsequent transmissions and/or receptions over the wireless channel. This solution is a robust solution of estimating angular spread and does not require detailed measurements for each antenna element.

Figure 1A:
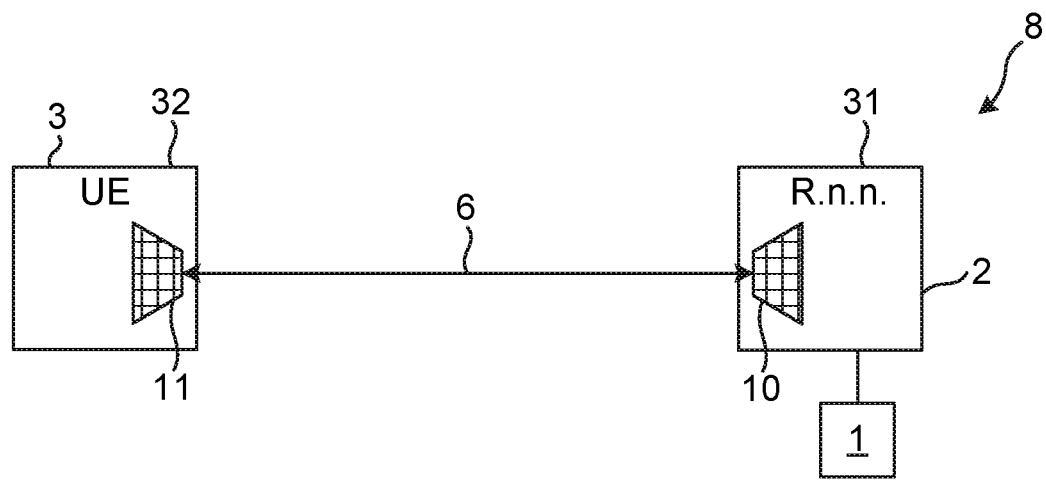
FIGS. 1A-B are schematic diagrams illustrating environments in which embodiments presented herein can be applied.
Figure 1B:
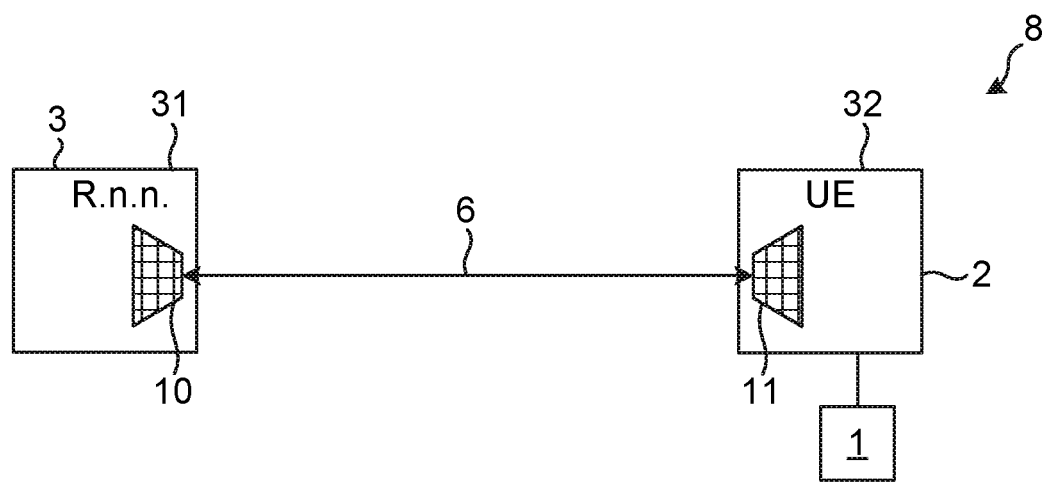

FIGS. 1A-B are schematic diagrams illustrating environments in which embodiments presented herein can be applied.

A user equipment (UE) 32 and a radio network node 31 form part of a cellular network 8. The radio network nodes 31, can be any suitable type of radio base stations e.g. gNode B, eNode Bs, etc. The radio network node 31 provides radio connectivity over a wireless channel 6 to a UE 32 The term UE is also known as wireless device, mobile terminal, mobile communication terminal, user terminal, user agent, wireless terminal, machine-to-machine device etc., and can be, for example, what today are commonly known as a mobile phone, smart phone, IoT (Internet of Things) device or a tablet/laptop with wireless connectivity.

The cellular communication network 8 may comply with any suitable standard, e.g. any one or a combination of 5G NR (New Radio), LTE (Long Term Evolution), LTE Advanced, or any other current or future cellular network, as long as the principles described hereinafter are applicable.

The radio network node 31 is also connected to a core network (not shown) for central functions and connectivity to a wide area network, such as the Internet.

Looking now to FIG. 1A, the radio network node 31 comprises an antenna 10 being an antenna array and in this embodiment, the radio network node is denoted a first node 2. The antenna array of the antenna 10 comprises a plurality of antenna elements to provide the ability to utilise dynamic beam configuration and/or spatial diversity, e.g. using MIMO (Multiple-Input and Multiple-Output).

The UE 32 comprises an antenna 11 and in this embodiment, the UE 32 is denoted a second node 3. The antenna 11 can be an antenna array comprising a plurality of antenna elements to provide the ability to utilise dynamic beam configuration and/or spatial diversity, e.g. using MIMO (Multiple-Input and Multiple-Output).

During beam determination, it is desired to determine a beamwidth that matches an angular spread of the wireless channel 6. The angular spread is determined by a spread determiner 1 that is connected to the first node 2. Alternatively, the spread determiner can form part of the first node 2. The spread determiner 1 can be located at the same site as the radio network node 31 or can be located elsewhere, with communication with the radio network node 31. As described in more detail below, the spread determiner 1 determines a spread based on differences of signal strengths over the wireless channel 6 for different beam configurations of the antenna array of the first node 2.

FIG. 1B are similar to the embodiment of FIG. 1A, but here the radio network node 31 is the second node 3 and the UE 32 is the first node 2. Hence, in the embodiment of FIG. 1A, the spread determiner 1 estimates angular spread based on the beam configurations of the radio network node 31, while in the embodiment of FIG. 1B, the spread determiner 1 estimates angular spread based on the beam configurations of the UE 32.

It is to be noted that the embodiments of FIGS. 1A-B can be combined in that both the radio network node 31 and the UE 32 are connected to, or contain, its own spread determiner. In such a case, each one of the radio network node 31 and the UE 32 is a first node from their own perspective, in which case the description herein can be applied for each one of the radio network node 31 and the UE 32 separately. It is also to be noted that when it is only the radio network node 31 that is the first node 2, the antenna 11 of the UE does not need to be an antenna array.

Figure 2A:
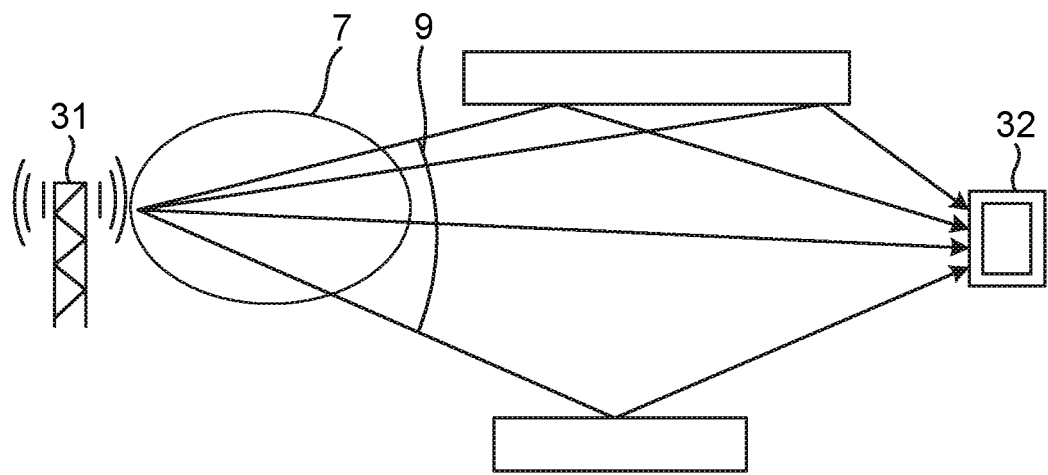
FIGS. 2A-B are schematic diagram illustrating the effect of different beamwidths for a wireless channel.
Figure 2B:
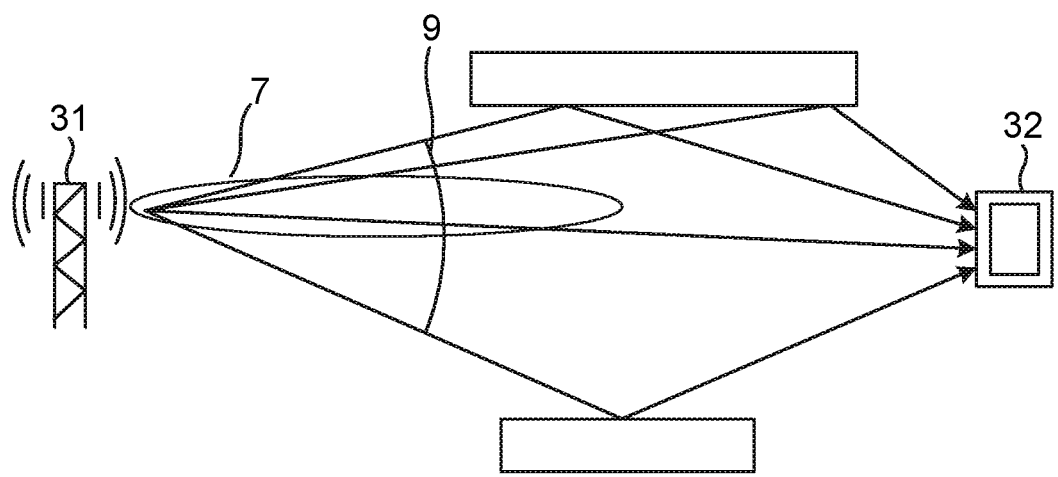

FIGS. 2A-B are schematic diagram illustrating the effect of different beamwidths for the angular spread 9 of a wireless channel (6 of FIGS. 1A-B). It is to be noted that while these diagrams illustrate transmissions from the radio network node 31 to the UE 32, the same principles are applicable in the reverse direction, from the UE 32 to the radio network node 31.

Looking first to FIG. 2A, a width of a beam 7 transmitted by the radio network node 31 is relatively wide. In this way, the beam covers the angular spread 9 of the components of the wireless channel. There are components of a variety of angles of the wireless channel due to reflection. Compare this to a scenario (not shown) when there are no reflections, where the angular spread of the components would be narrower.

Looking then to FIG. 2B, the width of the beam 7 of an antenna 10, 11 is relatively narrow (compared to the beam of FIG. 2A). In this example, the beam 7 is too narrow and only partly covers the angular spread 9 of the wireless channel, leading to all components of the wireless channel not being utilised. The case illustrated in 2B illustrates thus when the beamwidth of the beam 7 is mismatched with the angular spread 9, in that the beam 7 is too narrow for the angular spread of the wireless channel in this example.

Figure 3:
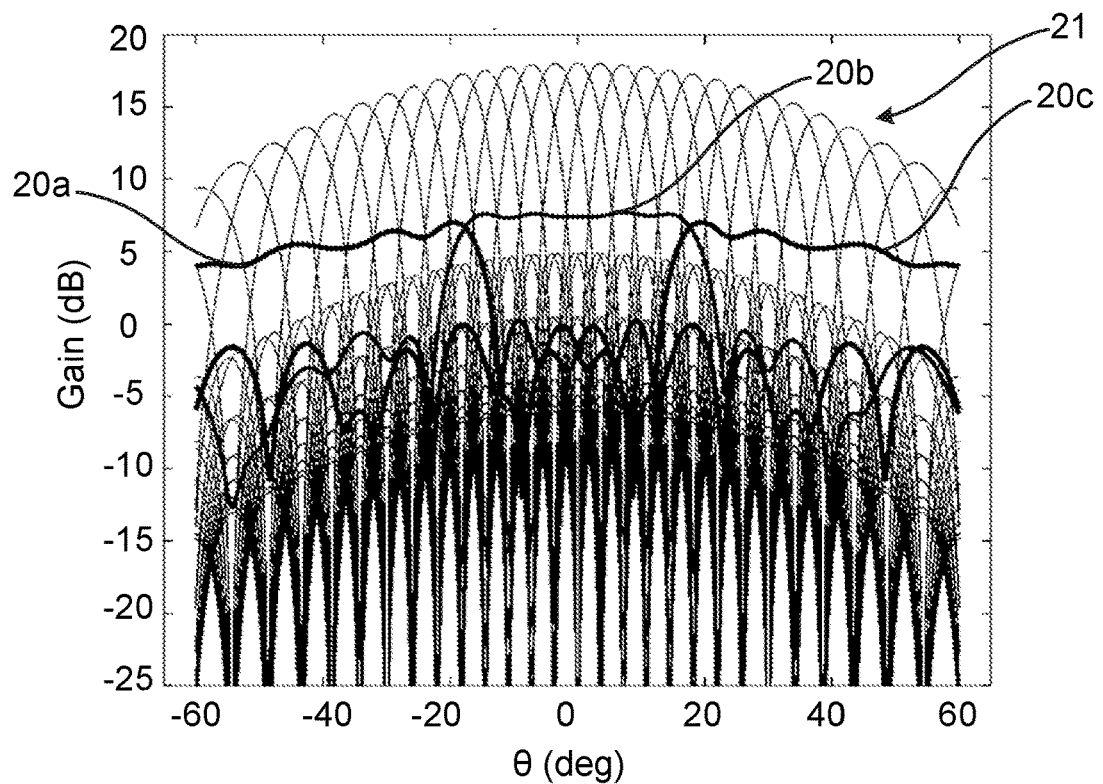
FIG. 3 is a graph illustrating the gain for a number of wide beams and narrow beams.

FIG. 3 is a graph illustrating gain for a number of wide beams and narrow beams, where the gain is plotted for each beam along a one-dimensional direction indicated in degrees relative a central direction of the antenna array. It is to be noted that while the gain values are here plotted in the vertical axis against the horizontal axis in degrees in one dimension, this is for reasons of clarity of illustration. The same principles described in embodiments presented herein can be applied for beams in a two-dimensional space. In FIG. 3, the vertical axis indicates gain.

It is shown wide beams in three directions with the thick lines: a left wide beam 20a, a centre wide beam 20b and right wide beam 20c. While somewhat difficult to distinguish in the black-and-white graph of FIG. 3, each one of the wide beams 20a-c has a directional range where the gain is about +5 dB and at other directions the gain is significantly lower. It can be seen how, for a specific direction between −60 and +60 degrees, the gain using an appropriately selected wide beam 20a-c, is around +5 dB. Appropriately selected here means selecting the wide beam 20a-c with the highest gain (i.e. greatest signal strength) for the direction in question. The wide beams 20a-c are conventionally used e.g. for initial access.

There are also a greater number narrow beams 21, naturally with peaks much closer together than the wide beams 20a-c. Each narrow beam has a smoother, but narrow peak, compared to the wide beams 20a-c. It can be seen how, for a specific direction between −60 and +60 degrees, the gain using an appropriately selected (i.e. the one with the highest gain for the direction) narrow beam 21, is between +9 to +18 dB.

Figure 4A:
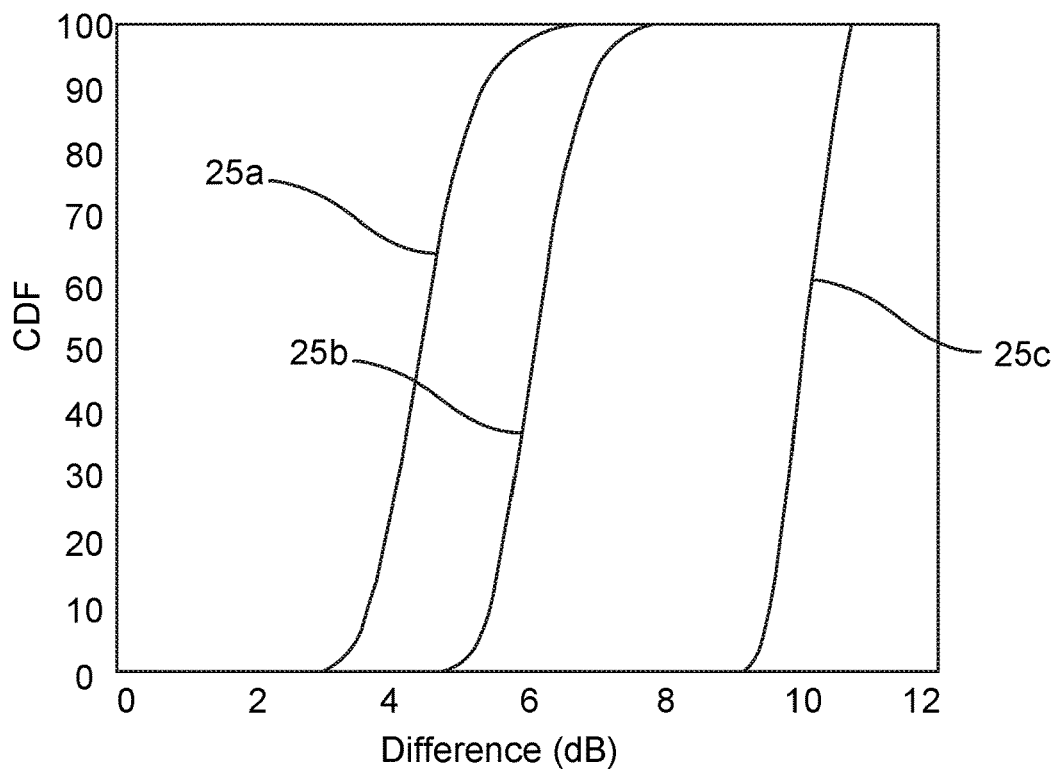
FIGS. 4A-C are graphs illustrating distribution of differences in gain between the best wide beam and the best narrow beam for various angular spreads and various wide beam directions.
Figure 4B:
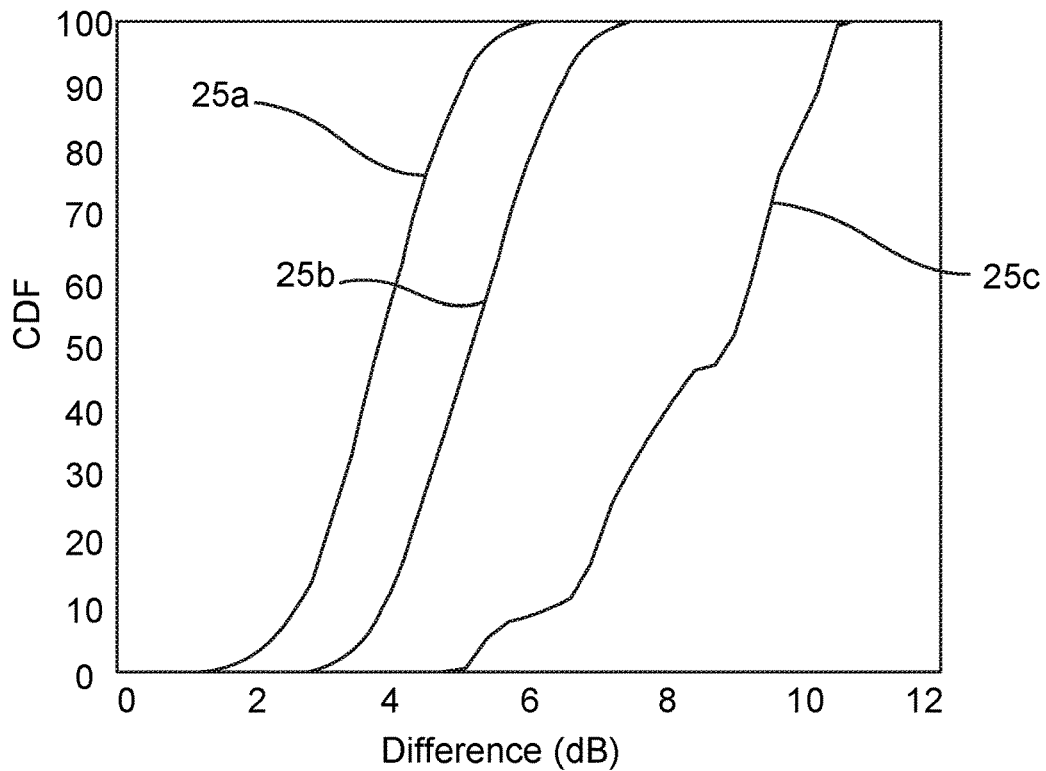
Figure 4C:
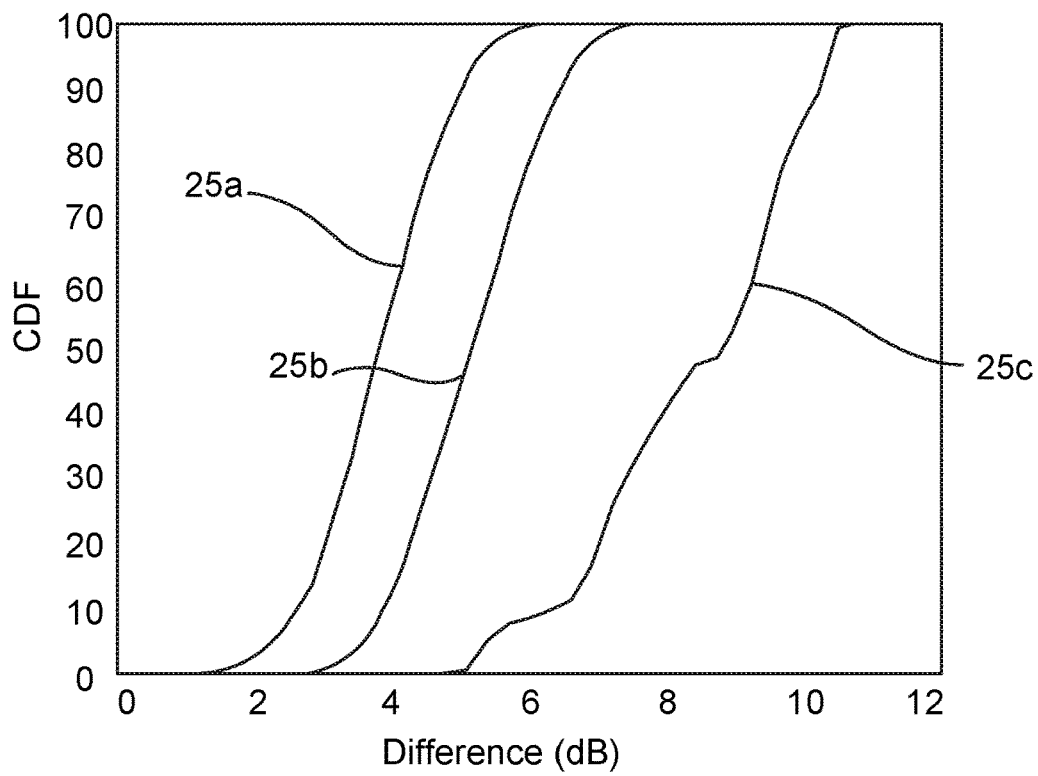

FIGS. 4A-C are graphs illustrating distribution of differences in gain between the best wide beam and the best narrow beam for various angular spreads and various wide beam directions. Best here means the beam in question that provides the highest signal strength. The graphs are based on simulations. More specifically, the power difference between a signal received in a selected wide-beam configuration and selected narrow-beam configuration is calculated for a wireless channel. Statistics is collected from 10.000 drops within a 120° coverage area of the radio network node. Each drop is a UE within +−60 deg (the 120 deg sector) of the coverage area. The power is the same for all drops. The wireless channel is then generated with an angular spread from 40 sub-path components which are spread around the drop angle with a standard deviation of 0, 7, or 15 degrees. The sub-path components are uniformly distributed around the drop angle (or not at all distributed for the 0-degree case). The wide beam power and narrow beam power are then calculated based on the combined signals over the sub-path components. The same simulation is repeated with 7° and 15° angular spread standard deviation. It is noted that the beamwidth of a typical narrow beam of the radio network node is approximately 6°.

In this particular example, there are variations in signal strength difference between the centre wide-beam configuration, and the outer (left and right) wide-beam configurations. This can be seen in FIG. 3, where the difference between the top of the wide beams 20a, 20b, 20c and the top of the narrow beams 21 varies more for outer directions. To compensate for this, different graphs are here shown for when the selected wide beam configuration has a centre direction, left direction and right direction. In a practical situation, an amplitude tapering can compensate for this difference, if seen necessary.

In FIGS. 4A-C, the horizontal axis indicates a difference in signal strength in terms of power of the same signal received using the best wide beam and the best narrow beam within the coverage of the best wide beam. The vertical axis discloses a distribution as a CDF (cumulative distribution function) from 0 to 100%. It is to be noted that the illustratory graphs are only for a particular example of codebook and configuration of antenna array, and the numbers can vary for other configurations. FIG. 4A illustrates the scenario for drops that fall in the sector of the centre wide-beam, FIG. 4B illustrates the scenario for drops that fall in the sector of the left wide-beam and FIG. 4C illustrates the scenario for drops that fall in the sector of the right wide-beam.

Looking first to FIG. 4A, this shows the difference in signal strength for the centre wide-beam 20b for three different angular spreads.

A first line 25a shows the distribution of difference in signal strength for an angular spread of 15 degrees. A second line 25b shows the distribution of difference in signal strength for an angular spread with a standard deviation of 7 degrees. A third line 25c shows the distribution of difference in signal strength for an angular spread with a standard deviation of 0 degrees.

It can be seen how the vast majority of cases for the angular spread with the standard deviation of 15 degrees, indicated by the first line 25a have a difference in the range of about [3, 5] dB. Analogously, it can be seen how the vast majority of cases for the angular spread with the standard deviation of 7 degrees, indicated by the second line 25b have a difference in the range of about [5, 7] dB. Moreover, it can be seen how the vast majority of cases for the angular spread with the standard deviation of 0 degrees, indicated by the third line 25c have a difference in the range of about [9, 11] dB.

Hence, by using the power difference between a signal received by a wide- and narrow-beam, respectively, the angular spread of the channel can be estimated, which can be used for finding a matching beamwidth for subsequent transmission and/or reception.

Looking first to FIG. 4B, this shows the difference in signal strength for the left wide-beam 20a for same three angular spreads (with the standard deviation 0, 7 and 15 degrees) that were evaluated in FIG. 4A.

The differences are here a little less distinct than for the centre wide beam case of FIG. 4A. Nevertheless, it can be seen how the vast majority of cases for the angular spread with the standard deviation of 15 degrees, indicated by the first line 25a have a difference in the range of about [2, 4] dB. Analogously, it can be seen how the vast majority of cases for the angular spread with the standard deviation of 7 degrees, indicated by the second line 25b have a difference in the range of about [4, 6] dB. Moreover, it can be seen how the vast majority of cases for the angular spread with the standard deviation of 0 degrees, indicated by the third line 25c have a difference in the range of about [6, 10] dB.

Looking first to FIG. 4C, this shows the difference in signal strength for the right wide-beam 20c for same three angular spreads (with the standard deviation 0, 7 and 15 degrees) that were evaluated in FIG. 4A. This graph is virtually identical to the graph in 4B for the left wide beam, due to symmetry around 0 degrees (see FIG. 3).

This association between angular spread and difference in signal strength between the best wide-beam configuration and the best narrow-beam configuration is exploited in method described some more detail below.

FIGS. 5A-B are flow charts illustrating embodiments of methods for estimating angular spread of a wireless channel 6 between a first node 2 and a second node 3. As shown in FIGS. 1A-B above, the first node 2 can be the radio network node and the second node 3 can be the UE or vice versa. The method is performed in a spread estimator 1. The spread estimator 1 is connected to, or forms part of, the first node 2. The method estimates an angular spread based on beam configuration of the antenna array of the first network node 2 (which can thus be the radio network node 31 or the UE 32) as will now be explained.

In an obtain wide-beam signal strength step 40, the spread estimator 1 obtains a wide-beam signal strength for a signal over the wireless channel 6 using a selected wide-beam configuration of an antenna 10, ii of the first node 2. The selected wide-beam configuration is the one, of a plurality of wide-beam configurations, that results in the greatest signal strength. For instance, looking to FIG. 3, for each direction, there is almost always a clear one of the three wide beams that provides the greatest signal strength.

In an obtain narrow-beam signal strength step 42, the spread estimator 1 obtains a narrow-beam signal strength for a signal over the wireless channel 6 using a selected narrow-beam configuration of the antenna 10, ii of the first node 2. The selected narrow-beam configuration is configured with a beam that is narrower than the selected wide-beam configuration. The selected narrow-beam configuration is the one of a plurality of narrow-beam configurations (within a coverage area of the selected wide-beam configuration) that results in the greatest signal strength. Looking again to FIG. 3, there is one of the narrow beams 21, within the coverage of any one of the wide beams 20*a-c*, that provides the greatest signal strength. The selected narrow-beam configuration is the one that best corresponds to the direction from which the signals are arriving.

The wide-beam signal strength and the narrow-beam signal strengths can be obtained for signals (transmitted by the second node 3 and) received by the first node 2. In this case, the second node 3 is a transmitter of the signal(s) that is used for measuring signal strength and the first node 2 is a receiver of the signal(s) that is used for measuring signal strength.

Alternatively, the wide-beam and narrow-beam signal strengths are obtained for signals (transmitted by the first node 2 and) received by the second node 3, where the signal strength is reported to the first node 2. In this case, the first node 2 is a transmitter of the signal(s) that is used for measuring signal strength and the second node 3 is a receiver of the signal(s) that is used for measuring signal strength.

For instance, the signal strength received in (or from) a wide beam can be collected from procedures for initial access of a UE to the system. For example, in some implementations, the SSB (Synchronization Signal Block) is periodically transmitted successively using the different wide beam configurations. The wide-beam signal strength can then be based on measurements of SSB transmissions from the radio network node over different wide-beam configurations. Each SSB, and hence wide beam configuration, can be identified by a unique number, the SSB index. The UE measures the signal strength of each SSB it detects during a certain period (the period of one SSB set). From the measurements the UE can identify the SSB index with the strongest signal strength. The beam of this SSB is the best beam for this UE.

From the information contained in the SSB, the UE can calculate when and where (time and frequency resource) it can transmit its RACH (Random Access Channel) preamble. When the RACH (preamble) is detected in the radio network node, the network can identify which SSB index that was used for this RACH attempt, since each SSB index will point to a specific time/frequency resource. The radio network node listens on a time/frequency resource using the same beam configuration that was used to transmit the SSB that pointed to the time/frequency resource. In this step the received power on the RACH can be measured by the network, and hence it is possible to associate a specific (wide)beam to a received signal strength.

After this initial access procedure, an exchange of information takes place between the radio network node and UE. For example, the beam management procedures start where the radio network node (and UE) can refine its beam choice. In this step the UE may send SRS (Sounding Reference Signal) that the radio network node can use to calculate the received power for the current (narrow) beam. Alternatively or in addition, the radio network node transmits CSI-RS (Channel State Information-Reference Signal) which the UE measures and reports back the RSRP (Reference Signal Received Power). Since the radio network node knows which (narrow) beam that was used to transmit the CSI-RS, this report indicates the power for this particular beam. Several instances of the CSI-RS can be sent in different narrow beams, and the UE reports the signal strength for each CSI-RS. Since the radio network node knows in which beam a particular CSI-RS was sent, it can do the association between signal strength reported from the UE and the narrow beam that was used. Hence, in this case, the narrow-beam signal strength is based on measurements of instances of CSI-RS from the radio network node over different narrow-beam configurations.

In a determine difference step 44, the spread estimator 1 determines a difference between the wide-beam signal strength of the selected wide-beam configuration and the narrow-beam signal strength of the selected narrow-beam configuration. This can be determined by subtracting the wide-beam signal strength (in decibels) from the narrow-beam signal strength (in decibels). This difference can then also be expressed in decibels.

In an estimate angular spread step 46, the spread estimator 1 estimates angular spread of the wireless channel 6 based on the difference.

For instance, this estimation can comprise selecting, based on the determined difference, a matching range from a plurality of ranges of differences, wherein each range is associated with a particular angular spread. See e.g. FIGS. 4A-C and the ranges mentioned above. The range can e.g. be expressed in decibels.

Optionally, the matching range is also selected based on a direction of the selected wide-beam configuration. Compare e.g. FIG. 4A, for the centre wide-beam configuration and FIG. 4B, for the left wide-beam configuration, and the ranges mentioned above for the different scenarios.

Looking now to FIG. 5B, only new or modified steps compared to what is shown in FIG. 5A are described.

In an optional select transmission beam step 48, the spread estimator 1 selects a transmission beam configuration based on the estimated angular spread. In particular, the beamwidth for a beam used for transmission can be configured to match the angular spread, so that a wide angular-spread results in wide transmission beam. The estimation of the angular spread is not very specific, but it can be used to prevent a transmission beam that is way off, in terms of beamwidth, compared to the actual angular spread. The transmission beam configuration is used for wireless transmissions from the first node 2 to the second node 3, e.g. using PDSCH (Physical Downlink Shared Channel) when the first node is the radio network node or PUSCH (Physical Uplink Shared Channel) when the first node is the UE.

In an optional select reception beam step 49, the spread estimator 1 selects a reception beam configuration based on the estimated angular spread. In particular, the beamwidth for a beam used for reception can be configured to match the angular spread, so that a wide angular-spread results in wide reception beam. The estimation of the angular spread is not very specific, but it can be used to prevent a reception beam that is way off, in terms of beamwidth, compared to the actual angular spread. The reception beam configuration is used for wireless receptions from by the first node 2 from the second node 3, e.g. using PUSCH when the first node is the radio network node or PDSCH when the first node is the UE.

It is to be noted that, typically, for a particular end point of a wireless channel there is a symmetry in angular spread in the uplink (UE to radio network node) and downlink (radio network node to UE), in particular when the frequency is in the same region. Hence, the angular spread for either or both of transmission and reception can be based on the estimation described herein, regardless if the signal strengths are based on transmissions from the first node 2 or receptions at the first node 2.

By estimating the angular spread of a wireless channel based on the difference in signal strength, an estimation is provided that does not require detailed measurements for each antenna element. This greatly reduces the required transmission capacity between the radio and baseband and also reduces the computational complexity for estimating the angular spread. There is no need to have a covariance matrix available for this estimation. Hence, this estimation can be performed e.g. at an early stage of communication between the radio network node and the UE, or at any other time when this estimation is more appropriate than those known in the prior art.

Figure 6:
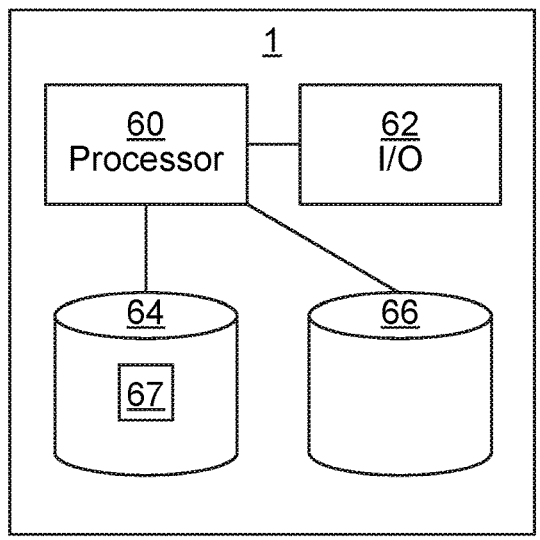
FIG. 6 is a schematic diagram illustrating components of the spread estimator of FIGS. 1A-B.

FIG. 6 is a schematic diagram illustrating components of the spread estimator 1 of FIGS. 1A-B. It is to be noted that when the spread estimator 1 is implemented in a host device, such as the radio network node 31 or the UE 32, one or more of the mentioned components can be shared with the host device. A processor 6o is provided using any combination of one or more of a suitable central processing unit (CPU), graphics processing unit (GPU), multiprocessor, microcontroller, digital signal processor (DSP), etc., capable of executing software instructions 67 stored in a memory 64, which can thus be a computer program product. The processor 6o could alternatively be implemented using an application specific integrated circuit (ASIC), field programmable gate array (FPGA), etc. The processor 6o can be configured to execute the method described with reference to FIGS. 5A-B above.

The memory 64 can be any combination of random-access memory (RAM) and/or read-only memory (ROM). The memory 64 also comprises non-transitory persistent storage, which, for example, can be any single one or combination of magnetic memory, optical memory, solid-state memory or even remotely mounted memory.

A data memory 66 is also provided for reading and/or storing data during execution of software instructions in the processor 6o. The data memory 66 can be any combination of RAM and/or ROM.

The spread estimator 1 further comprises an I/O interface 62 for communicating with external and/or internal entities. Optionally, the I/O interface 62 also includes a user interface.

Other components of the spread estimator 1 are omitted in order not to obscure the concepts presented herein.

Figure 7:
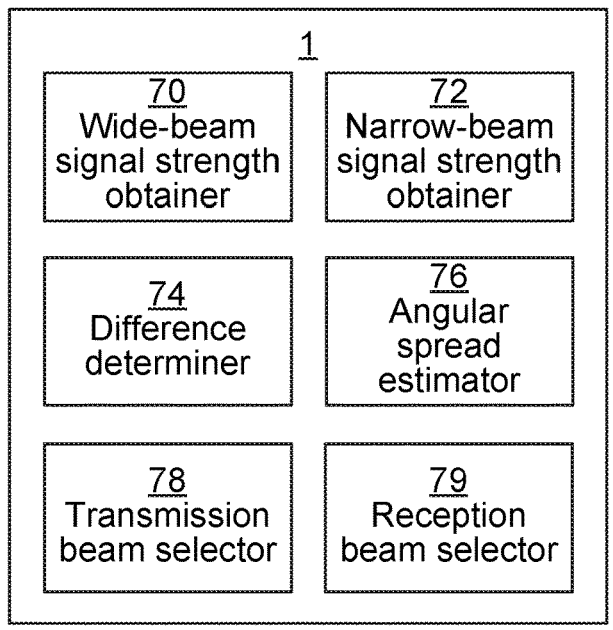
FIG. 7 is a schematic diagram showing functional modules of the spread estimator 1 of FIGS. 1A-B according to one embodiment.

FIG. 7 is a schematic diagram showing functional modules of the spread estimator 1 of FIGS. 1A-B according to one embodiment. The modules are implemented using software instructions such as a computer program executing in the spread estimator 1. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIGS. 5A and 5B.

A wide-beam signal strength obtainer 70 corresponds to step 4o. A narrow-beam signal strength obtainer 72 corresponds to step 42. A difference determiner 74 corresponds to step 44. An angular spread estimator 76 corresponds to step 46. A transmission beam selector 78 corresponds to step 48. A reception beam selector 79 corresponds to step 49.

Figure 8:
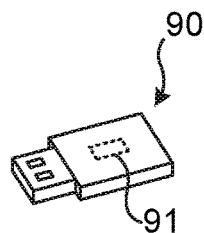
FIG. 8 shows one example of a computer program product comprising computer readable means.

FIG. 8 shows one example of a computer program product 90 comprising computer readable means. On this computer readable means, a computer program 91 can be stored, which computer program can cause a processor to execute a method according to embodiments described herein. In this example, the computer program product is in the form of a removable solid-state memory, e.g. a Universal Serial Bus (USB) drive. As explained above, the computer program product could also be embodied in a memory of a device, such as the computer program product 64 of FIG. 6. While the computer program 91 is here schematically shown as a section of the removable solid-state memory, the computer program can be stored in any way which is suitable for the computer program product, such as another type of removable solid-state memory, or an optical disc, such as a CD (compact disc), a DVD (digital versatile disc) or a Blu-Ray disc.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method for estimating angular spread of a wireless channel between a first node and a second node, wherein the first node is a radio network node and the second node is a user equipment, UE, or vice versa, the method being performed in a spread estimator, the method comprising the steps of:
    obtaining a wide-beam signal strength for a signal over the wireless channel using a selected wide-beam configuration of an antenna of the first node, the selected wide-beam configuration being the one, of a plurality of wide-beam configurations, that results in the greatest signal strength;
    obtaining a narrow-beam signal strength for a signal over the wireless channel using a selected narrow-beam configuration of the antenna of the first node, the selected narrow-beam configuration being configured with a beam that is narrower than the selected wide-beam configuration, the selected narrow-beam configuration being the one of a plurality of narrow-beam configurations within a coverage area of the selected wide-beam configuration that results in the greatest signal strength;
    determining a difference between the wide-beam signal strength and the narrow-beam signal strength; and
    estimating angular spread of the wireless channel based on the difference.

2. The method according to claim 1, wherein the step of estimating angular spread comprises selecting, based on the determined difference, a matching range from a plurality of ranges of differences, wherein each range is associated with a particular angular spread.

3. The method according to claim 2, wherein the matching range is also selected based on a direction of the selected wide-beam configuration.

4. The method according to claim 1, wherein the wide-beam signal strength is obtained for a signal received by the first node and wherein the narrow beam signal strength is obtained for a signal received by the first node.

5. The method according to claim 1, wherein the wide-beam signal strength is obtained for a signal received by the second node and reported to the first node, and wherein the narrow beam signal strength is obtained for a signal received by the second node and reported to the first node.

6. The method according to claim 5, wherein the wide-beam signal strength is based on measurements of SSB, Synchronization Signal Block, transmissions from the radio network node over different wide-beam configurations.

7. The method according to claim 5, wherein the narrow-beam signal strength is based on measurements of instances of CSI-RS, Channel State Information-Reference Signal, from the radio network node over different narrow-beam configurations.

8. The method according to claim 1, further comprising the step of:
 selecting a transmission beam configuration based on the estimated angular spread, wherein the transmission beam configuration is used for wireless transmissions from the first node to the second node.

9. The method according to claim 1, further comprising the step of:
 selecting a reception beam configuration based on the estimated angular spread, wherein the reception beam configuration is used for wireless receptions by the first node from the second node.

10. The method according to claim 1, wherein the first node is a radio network node and the second node is user equipment, UE.

11. The method according to claim 1, wherein the first node is a UE and the second node is a radio network node.

12. A spread estimator for estimating angular spread of a wireless channel between a first node and a second node, wherein the first node is a radio network node and the second node is a user equipment, UE, or vice versa, the spread estimator comprising:
 a processor; and
 a memory storing instructions that, when executed by the processor, cause the spread estimator to:
  obtain a wide-beam signal strength for a signal over the wireless channel using a selected wide-beam configuration of an antenna of the first node, the selected wide-beam configuration being the one, of a plurality of wide-beam configurations, that results in the greatest signal strength;
  obtain a narrow-beam signal strength for a signal over the wireless channel using a selected narrow-beam configuration of the antenna of the first node, the selected narrow-beam configuration being configured with a beam that is narrower than the selected wide-beam configuration, the selected narrow-beam configuration being the one of a plurality of narrow-beam configurations within a coverage area of the selected wide-beam configuration that results in the greatest signal strength;
  determine a difference between the wide-beam signal strength and the narrow-beam signal strength; and
  estimate angular spread of the wireless channel based on the difference.

13. The spread estimator according to claim 12, wherein the instructions to estimate angular spread comprise instructions that, when executed by the processor, cause the spread estimator to select, based on the determined difference, a matching range from a plurality of ranges of differences, wherein each range is associated with a particular angular spread.

14. The spread estimator according to claim 13, wherein the matching range is also selected based on a direction of the selected wide-beam configuration.

15. The spread estimator according to claim 12, wherein the wide-beam signal strength is obtained for a signal received by the first node and wherein the narrow beam signal strength is obtained for a signal received by the first node.

16. The spread estimator according to claim 12, wherein the wide-beam signal strength is obtained for a signal received by the second node and reported to the first node, and wherein the narrow beam signal strength is obtained for a signal received by the second node and reported to the first node.

17. The spread estimator according to claim 16, wherein the wide-beam signal strength is based on measurements of SSB, Synchronization Signal Block, transmissions from the radio network node over different wide-beam configurations.

18. The spread estimator according to claim 16, wherein the narrow-beam signal strength is based on measurements of instances of CSI-RS, Channel State Information-Reference Signal, from the radio network node over different narrow-beam configurations.

19. The spread estimator according to claim 12, further comprising instructions that, when executed by the processor, cause the spread estimator to:
 select a transmission beam configuration based on the estimated angular spread, wherein the transmission beam configuration is used for wireless transmissions from the first node to the second node.

20. A non-transitory computer-readable medium storing instructions executable by processing circuitry of a computing system for implementing a spread estimator for estimating angular spread of a wireless channel between a first node and a second node, wherein the first node is a radio network node and the second node is a user equipment, UE, or vice versa, which, when executed by the processing circuitry cause the computing system to:
 obtain a wide-beam signal strength for a signal over the wireless channel using a selected wide-beam configuration of an antenna of the first node, the selected wide-beam configuration being the one, of a plurality of wide-beam configurations, that results in the greatest signal strength;
 obtain a narrow-beam signal strength for a signal over the wireless channel using a selected narrow-beam configuration of the antenna of the first node, the selected narrow-beam configuration being configured with a beam that is narrower than the selected wide-beam configuration, the selected narrow-beam configuration being the one of a plurality of narrow-beam configurations within a coverage area of the selected wide-beam configuration that results in the greatest signal strength;
 determine a difference between the wide-beam signal strength and the narrow-beam signal strength; and estimate angular spread of the wireless channel based on the difference.

* * * * *